US012759200B2

(12) United States Patent
Yamamoto et al.

(10) Patent No.: US 12,759,200 B2
(45) Date of Patent: Oct. 13, 2026

(54) METHOD FOR MANUFACTURING PLASTIC MOLDED ARTICLE AND PLASTIC MOLDED ARTICLE

(71) Applicant: TOYODA GOSEI CO., LTD., Kiyosu (JP)

(72) Inventors: Shohei Yamamoto, Kiyosu (JP); Kazuki Takao, Kiyosu (JP); Hideto Maeda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 161 days.

(21) Appl. No.: 18/588,244

(22) Filed: Feb. 27, 2024

(65) Prior Publication Data

US 2024/0326303 A1 Oct. 3, 2024

(30) Foreign Application Priority Data

Apr. 3, 2023 (JP) ................................ 2023-060214

(51) Int. Cl.

| | |
|---|---|
| ***B29C 45/00*** | (2006.01) |
| ***B29B 17/04*** | (2006.01) |
| ***B29K 105/00*** | (2006.01) |
| ***B29K 105/26*** | (2006.01) |
| *B29K 23/00* | (2006.01) |

(52) U.S. Cl.

CPC ...... *B29C 45/0013* (2013.01); *B29B 17/0404* (2013.01); *B29K 2023/12* (2013.01); *B29K 2105/0032* (2013.01); *B29K 2105/26* (2013.01); *Y02W 30/62* (2015.05); *Y10S 264/921* (2013.01)

(58) Field of Classification Search

CPC ............ B29C 45/0013; Y10S 264/921; B29B 17/0404; Y02W 30/62; B29K 2023/12; B29K 2105/0032; B29K 2105/26

See application file for complete search history.

(56) References Cited

U.S. PATENT DOCUMENTS

2004/0130053 A1* 7/2004 Suzuki .................... C08J 11/06 264/911
2024/0165865 A1* 5/2024 Yamamoto .......... B29C 45/0013

FOREIGN PATENT DOCUMENTS

JP H08-309750 A 11/1996
JP 2001341173 A 12/2001
JP 2001353742 A 12/2001

OTHER PUBLICATIONS

Office Action issued Jan. 6, 2026 in corresponding Japanese patent application No. 2023-060214 (and English machine translation).

* cited by examiner

*Primary Examiner* — Jerzi H Moreno Hernandez
(74) *Attorney, Agent, or Firm* — Posz Law Group, PLC

(57) ABSTRACT

A method for manufacturing a plastic molded article includes producing a granular waste material by finely pulverizing a waste material that includes a base made of a thermoplastic and a decorative layer provided on a surface of the base, producing a molten waste material by melting the granular waste material, injecting the molten waste material into a cavity of a mold and maintaining the molten waste material in a molten state in the cavity, and molding the plastic molded article by cooling the molten waste material that is maintained in the molten state.

8 Claims, 3 Drawing Sheets

METHOD FOR MANUFACTURING PLASTIC MOLDED ARTICLE AND PLASTIC MOLDED ARTICLE

BACKGROUND

1. Field

The present disclosure relates to a method for manufacturing a plastic molded article and a plastic molded article.

2. Description of Related Art

Japanese Laid-Open Patent Publication No. 8-309750 discloses a method for manufacturing a plastic molded article by collecting a waste material that is a plastic product with a painted surface, such as an automobile bumper, and reusing the collected waste material as a raw material. In this method, first, the waste material is pulverized into particles of appropriate sizes and is further finely pulverized to produce granular waste material. The granular waste material includes a granular plastic base and a granular paint. Since the granular plastic base and the granular paint included in the granular waste material have different specific gravities, the granular plastic base and the granular paint are separated from each other by a known specific gravity separation. Subsequently, only the separated granular plastic base is used as a raw material to manufacture a plastic molded article.

The method described in the above publication limits degradation of the aesthetic appearance of a plastic molded article manufactured using a waste material. However, since only the granular plastic base is separated from the granular waste material, which has been produced by pulverizing the waste material in two stages, using a known specific gravity separation, the number of manufacturing steps is increased. Therefore, it is desired to limit degradation of the aesthetic appearance of a plastic molded article manufactured using a waste material, while reducing the number of steps for manufacturing the plastic molded article.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a method for manufacturing a plastic molded article includes producing a granular waste material by finely pulverizing a waste material that includes a base made of a thermoplastic and a decorative layer provided on a surface of the base, producing a molten waste material by melting the granular waste material, injecting the molten waste material into a cavity of a mold and maintaining the molten waste material in a molten state in the cavity, and molding the plastic molded article by cooling the molten waste material that is maintained in the molten state.

In a second general aspect, a method for manufacturing a plastic molded article includes producing a granular waste material by finely pulverizing a waste material including a molded body made of a thermoplastic colored with a pigment, producing a molten waste material by melting the granular waste material, injecting the molten waste material into a cavity of a mold and maintaining the molten waste material in a molten state in the cavity, and molding the plastic molded article by cooling the molten waste material that is maintained in the molten state.

In a third general aspect, a plastic molded article includes a base material made of a thermoplastic and particles dispersed in the base material and exhibiting a color different from that of the base material. The base material includes a decorative surface, a first region that includes the decorative surface and a region proximate to the decorative surface, and a second region that is different from the first region. A proportion of the particles existing in the first region is lower than a proportion of the particles existing in the second region.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment will now be described with reference to the drawings.

Plastic Molded Article 11

Figure 1:
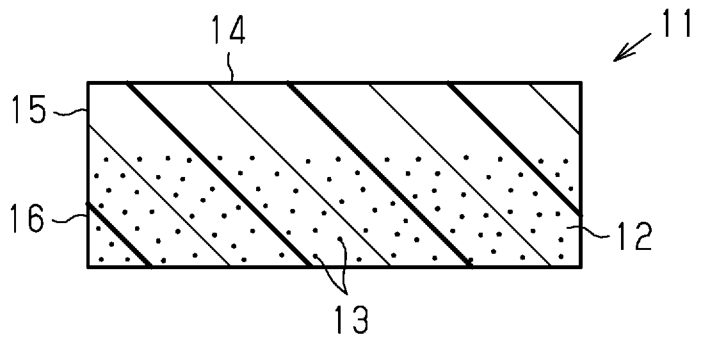
FIG. 1 is a schematic cross-sectional view of a plastic molded article according to an embodiment.

A plastic molded article 11 shown in FIG. 1 is an exterior component such as a vehicle bumper cover. The plastic molded article 11 includes a base material 12 made of a thermoplastic, and decorative particles 13, which are examples of particles dispersed in the base material 12. The base material 12 is formed from, for example, polypropylene (PP).

The decorative particles 13 are, for example, particles that are produced by finely pulverizing a decorative layer contained, for example, in a waste material of a vehicle bumper cover. The decorative layer includes, for example, a paint film, a plating layer, a hot stamping layer, a film layer, a vapor deposition layer, and a print layer. The maximum diameter of the decorative particles 13 is, for example, 300 μm. The decorative particles 13 exhibit a color different from that of the base material 12.

The plastic molded article 11 includes a flat decorative surface 14. The plastic molded article 11 includes a first region 15, which includes the decorative surface 14 and a region proximate to the decorative surface 14, and a second region 16 that is different from the first region 15. The second region 16 contains most of the decorative particles 13. The first region 15 contains almost none of the decorative particles 13. The proportion of the decorative particles 13 existing in the first region 15 is significantly lower than the proportion of the decorative particles 13 existing in the second region 16.

A method for manufacturing the plastic molded article 11 will now be described.

Figure 2:
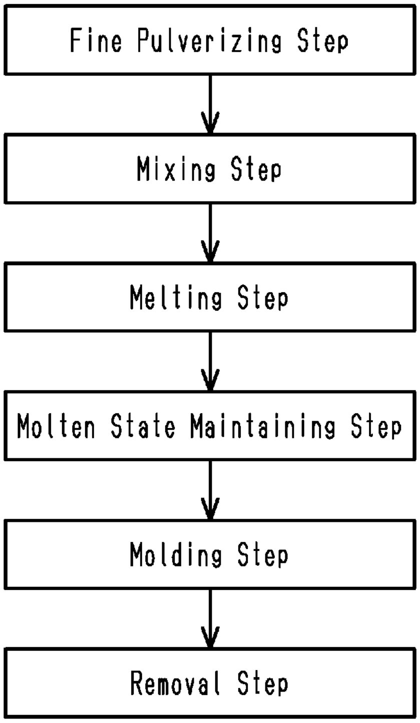
FIG. 2 is a flowchart showing a method for producing the plastic molded article shown in FIG. 1.

As shown in FIG. 2, the method for manufacturing the plastic molded article 11 includes a fine pulverizing step, a mixing step, a melting step, a molten state maintaining step, a molding step, and a removal step.

Fine Pulverizing Step

In the fine pulverizing step, a waste material (not shown) that includes a thermoplastic base and a decorative layer on the surface of the base is finely pulverized using a known pulverizer to produce a granular waste material containing the decorative particles 13. The waste material is, for example, a vehicle bumper cover.

Mixing Step

In the mixing step, a granular mixture is produced by mixing the granular waste material (not shown), which has been finely pulverized in the fine pulverizing step, with a granular virgin material (not shown) of a thermoplastic that is the same as that of the base.

Melting Step

In the melting step, the granular mixture, which has been produced in the mixing step, is supplied to a cylinder of a known injection molding apparatus. A heater is energized to heat the granular mixture in the cylinder to melt the granular mixture at a temperature higher than or equal to the melting point of the thermoplastic, thereby producing a molten mixture. The decorative particles 13 remain granular without being melted in the molten mixture.

Molten State Maintaining Step

Figure 3:
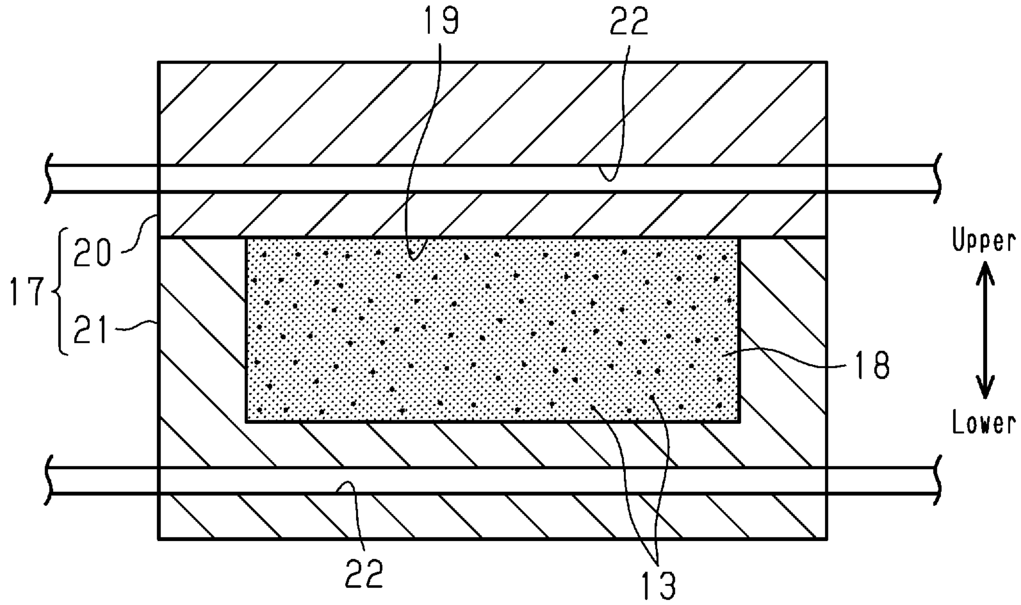
FIG. 3 is a schematic cross-sectional view of a mold for molding the plastic molded article shown in FIG. 1, in a state in which a molten mixture is injected into the mold.

As shown in FIG. 3, in the molten state maintaining step, the molten mixture produced in the melting step is injected into a cavity 18 of a mold 17 in a clamped state from the cylinder, and the molten mixture in the cavity 18 is maintained in a molten state. The mold 17 includes a first mold member 20 and a second mold member 21. The first mold member 20 includes a molding surface 19 for molding the decorative surface 14 of the plastic molded article 11. The second mold member 21 faces the first mold member 20. The first mold member 20 and the second mold member 21 are opened and closed in the vertical direction. The first mold member 20 is disposed above the second mold member 21. The mold 17 includes one or more heat medium passages 22, through which pressurized hot water flows, in order to control the temperature of the cavity 18.

The molten mixture in the cavity 18 is maintained in a molten state by pressurized hot water caused to flow through the heat medium passages 22. Specifically, when the pressurized hot water is caused to flow through the heat medium passages 22 in the mold 17, the molten mixture in the cavity 18 is prevented from being solidified by being instantaneously cooled through heat exchange with the mold 17. The molten mixture in the cavity 18 contains the waste material, which contains the base and the decorative particles 13. The decorative particles 13 have a specific gravity greater than those of the base and the virgin material.

Figure 4:
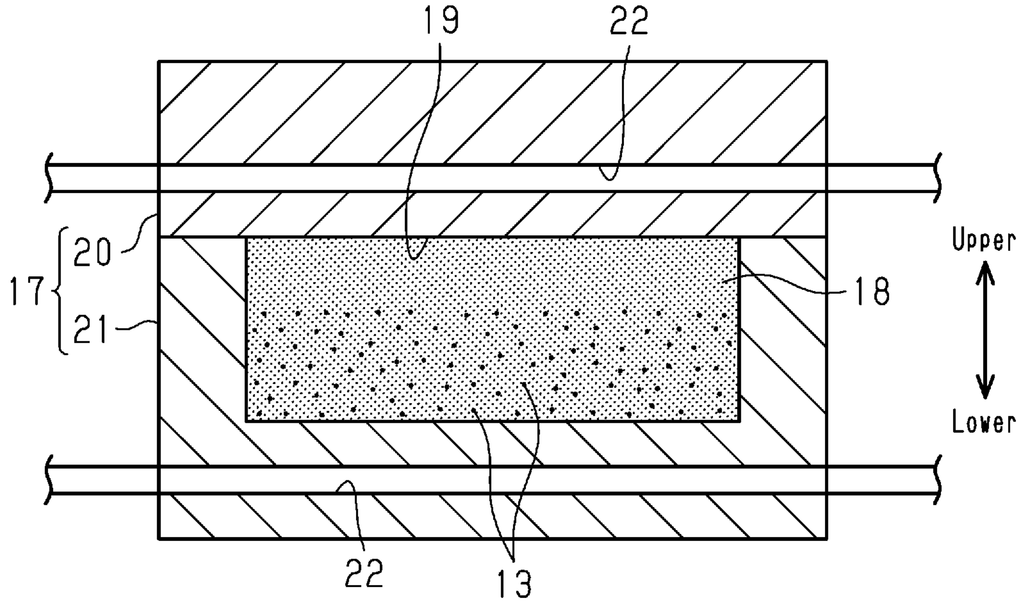
FIG. 4 is a schematic cross-sectional view illustrating a state in which decorative particles contained in the molten mixture shown in FIG. 3 have precipitated.

Accordingly, as shown in FIG. 4, when the molten mixture is maintained in a molten state in the cavity 18, the decorative particles 13 contained in the molten mixture move downward to the side opposite to the molding surface 19 due to gravity and precipitate. This eliminates most of the decorative particles 13 that exist in the upper region of the molten mixture that is proximate to the molding surface 19.

In the molten state maintaining step, the time during which the molten mixture is maintained in a molten state in the cavity 18 is set to the time required for the decorative particles 13 contained in the molten mixture to sufficiently precipitate due to gravity. The molten state maintaining time is, for example, approximately 30 seconds to 60 seconds, and is determined in advance by performing experiments and simulations.

Molding Step

In the molding step, the plastic molded article 11 (refer to FIG. 5) is molded by cooling the molten mixture, which has been maintained in a molten state in the molten state maintaining step. Specifically, in the molding process, cold water, instead of pressurized hot water, is caused to flow through the heat medium passages 22, so as to cool and solidify the molten mixture in the cavity 18.

Removal Step

Figure 5:
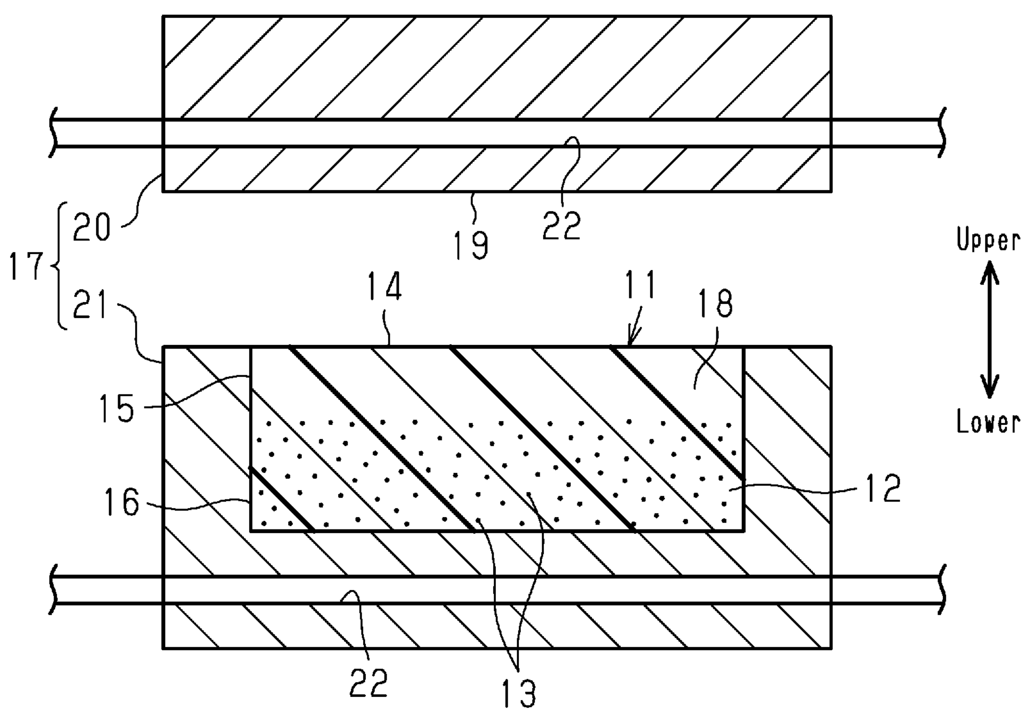
FIG. 5 is a schematic cross-sectional view illustrating a state in which the mold is open after the plastic molded article shown in FIG. 1 has been molded.

As shown in FIG. 5, in the removal step, the mold 17 is opened to remove the plastic molded article 11, which has been molded in the molding step, from the second mold member 21.

Operation of Embodiment

As shown in FIG. 1, the plastic molded article 11, which is molded from the waste material, contains few decorative particles 13 in the first region 15, which includes the decorative surface 14 and a region proximate to the decorative surface 14. Therefore, the decorative particles 13 are unlikely to appear on the decorative surface 14. This prevents the decorative particles 13 from degrading the aesthetic appearance of the plastic molded article 11.

Advantages of Embodiment

The above-described embodiment achieves the following advantages.

(1) The method for manufacturing the plastic molded article 11 includes the fine pulverizing step, the melting step, the molten state maintaining step, and the molding step.

The molten state maintaining step of the above-described method maintains the molten waste material in a molten state in the cavity 18. This prevents the molten waste material from being instantaneously cooled and solidified through heat exchange with the mold 17. Thus, in the molten state maintaining step, the decorative particles 13, which are contained in the molten waste material, precipitate in the cavity 18 due to gravity. This reduces the proportion of the decorative particles 13 existing in the region that includes the decorative surface 14 in the plastic molded article 11. This limits degradation of the aesthetic appearance of the plastic molded article 11, which is manufactured using a waste material.

In order to limit degradation of the aesthetic appearance of a plastic molded article manufactured using a waste material, the technique of Japanese Laid-Open Patent Publication No. 8-309750 described in BACKGROUND produces a granular waste material through two-stage pulverizing. Specifically, the technique first pulverizes a waste material and then even finely pulverizing the waste material to produce a granular waste material. The produced granular waste material is separated into particles of the plastic base and the decorative particles. However, the present embodiment does not require such a two-stage pulverizing steps and a particle separating step. This reduces the number of steps for manufacturing the plastic molded article 11.

It is thus possible to limit degradation of the aesthetic appearance of the plastic molded article 11 manufactured using a waste material, while reducing the number of steps for manufacturing the plastic molded article 11.

(2) The method for manufacturing the plastic molded article 11 includes the mixing step, which produces, prior to the melting step, the granular mixture by mixing the granular waste material and the granular virgin material. In the melting step, the granular mixture is melted.

With the above-described method, the specific gravity of the virgin material is less than that of the waste material. This reduces the proportion of the waste material in the first region 15, which includes the decorative surface 14, in the plastic molded article 11. This further reduces the amount of the decorative particles 13 that exist in the first region 15 of the plastic molded article 11. This further effectively limits degradation of the aesthetic appearance of the plastic molded article 11, which is manufactured using a waste material.

In addition, the plastic molded article 11 includes the virgin material. This increases the mechanical strength of the plastic molded article 11 as compared to a case in which the plastic molded article 11 is made only of a waste material.

MODIFICATIONS

The above-described embodiment may be modified as follows. The above-described embodiment and the following modifications can be combined as long as the combined modifications remain technically consistent with each other.

Figure 6:
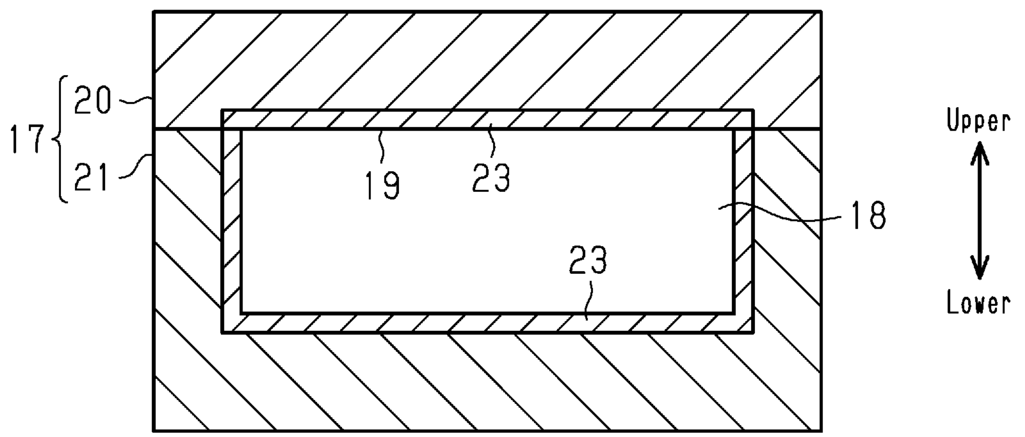
FIG. 6 is a schematic cross-sectional view showing a mold according to a modification.

As shown in FIG. 6, a heat insulating layer 23 may be provided on a surface of the mold 17 that faces the cavity 18. The heat insulating layer 23 is made of a material having a relatively low thermal conductivity. The material having a relatively low thermal conductivity includes, for example, a metal material having a relatively low thermal conductivity, such as austenitic stainless steel (such as SUS304), polyimide, ceramic, and the like. In this case, even if a heating fluid is not caused to flow through the heat medium passages 22 of the mold 17 in the molten state maintaining step, the molten mixture is maintained in a molten state in the cavity 18. Thus, the heat medium passages 22 can be omitted from the mold 17.

In the molten state maintaining step, the method of heating the cavity 18 is not limited to the above-described method, which uses pressurized hot water. Instead, the cavity 18 may be heated by steam, heated oil, high-frequency induction, radiation heating, energization heating, a cartridge heater, or a tubular heater.

The mold 17 may separately include a heat medium passage 22 for pressurized hot water flows and a heat medium passage 22 for cold water.

The mixing step may be omitted. In this case, the plastic molded article 11 is manufactured only from the waste material.

The base material 12 is not limited to polypropylene, but may be another thermoplastic such as polyethylene terephthalate.

The plastic molded article 11 is not limited to an exterior component such as a vehicle bumper cover, but and may be a vehicle interior component such as an instrument panel.

In the fine pulverizing step of the above-described embodiment, the waste material, which includes the base made of a thermoplastic and the decorative layer provided on the surface of the base, is finely pulverized to produce the granular waste material granular. However, a waste material that includes a thermoplastic molded body colored with a pigment may be finely pulverized to produce the granular waste material. In the mixing step in this case, the granular waste material that has been finely pulverized in the fine pulverizing step may be mixed with a granular virgin material that is the same thermoplastic as that of the molded body, and exhibits a color different from that of the waste material. The melting step, the melting state maintaining step, and the molding step may be performed in the same manner as in the above-described embodiment. The pigment particles have a specific gravity higher than that of the thermoplastic forming the molded body. Thus, in the molten state maintaining step, the pigment particles, which are contained in the molten waste material, precipitate in the cavity due to gravity. This configuration has the same advantages as the above-described embodiment. The mixing step may be omitted.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a plastic molded article, the method comprising:

producing a granular waste material by finely pulverizing a waste material that includes a base made of a thermoplastic and a decorative layer provided on a surface of the base;

producing a molten waste material by melting the granular waste material;

injecting the molten waste material into a cavity of a mold, wherein the mold has a molding surface for forming a decorative surface of the plastic molded article, and the mold is arranged such that the molding surface is positioned over the molten waste material in the cavity in a direction of gravity;

maintaining the molten waste material in a molten state in the cavity for a predetermined time by maintaining a temperature in the cavity at a temperature at which solidification of the molten waste material can be avoided, wherein the predetermined time is a time sufficient for particles of the decorative layer contained in the molten waste material to precipitate in the cavity due to gravity; and molding the plastic molded article by cooling the molten waste material that is maintained in the molten state.

2. The manufacturing method according to claim 1, further comprising, prior to the melting of the granular waste material, producing a granular mixture by mixing the granular waste material and a granular virgin material that is made of the same thermoplastic as that of the base, wherein the melting of the granular waste material includes melting the granular mixture.

3. The manufacturing method according to claim 1, wherein during the maintaining of the molten waste material in the molten state, heating fluid flows through a heat medium passage in the mold.

4. The manufacturing method according to claim 1, wherein the predetermined time is 30 seconds to 60 seconds.

5. A method for manufacturing a plastic molded article, the method comprising:

producing a granular waste material by finely pulverizing a waste material including a molded body made of a thermoplastic colored with a pigment;

producing a molten waste material by melting the granular waste material;

injecting the molten waste material into a cavity of a mold, wherein the mold has a molding surface for forming a decorative surface of the plastic molded article, and the mold is arranged such that the molding surface is positioned over the molten waste material in the cavity in a direction of gravity;

maintaining the molten waste material in a molten state in the cavity for a predetermined time by maintaining a temperature in the cavity at a temperature at which solidification of the molten waste material can be avoided, wherein the predetermined time is a time sufficient for particles of the pigment contained in the molten waste material to precipitate in the cavity due to gravity; and molding the plastic molded article by cooling the molten waste material that is maintained in the molten state.

6. The manufacturing method according to claim 5, further comprising, prior to the melting of the granular waste material, producing a granular mixture by mixing the granular waste material and a granular virgin material that is made of the same thermoplastic as that of the molded body and exhibits a color different from that of the waste material, wherein the melting of the granular waste material includes melting the granular mixture.

7. The manufacturing method according to claim 5, wherein during the maintaining of the molten waste material in the molten state, heating fluid flows through a heat medium passage in the mold.

8. The manufacturing method according to claim 5, wherein the predetermined time is 30 seconds to 60 seconds.

* * * * *